Oct. 30, 1956
P. A. NORTHRUP
2,768,460
ARTICLE OF MANUFACTURE IN THE FORM
OF EMBLEMS, LABELS, NAMEPLATES, AND
THE LIKE
Filed Dec. 24, 1954
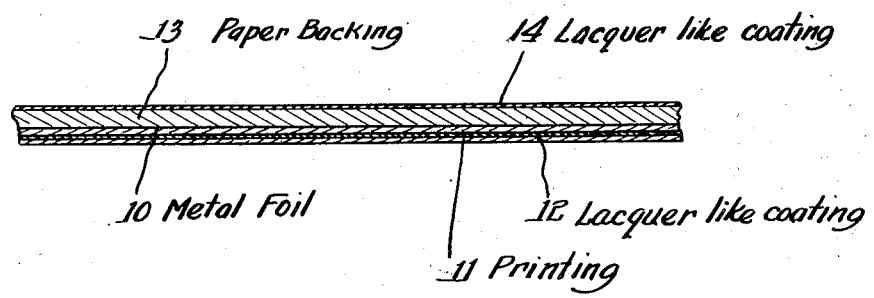
INVENTOR.
Paul A. Northrup
BY
Wallenstein & Spangenberg
Attys.

United States Patent Office 2,768,460
Patented Oct. 30, 1956

2,768,460

ARTICLE OF MANUFACTURE IN THE FORM OF EMBLEMS, LABELS, NAMEPLATES, AND THE LIKE

Paul A. Northrup, Chicago, Ill., assignor to Master Craft Decalcomania Co., Chicago, Ill., a corporation of Illinois Application December 24, 1954, Serial No. 477,541

1 Claim. (Cl. 40—135)

My invention relates to improvements in articles of manufacture of the type which are commonly adhered to a suitable surface and are used as nameplates, advertising media, signs, emblems, labels and for a wide variety of other purposes.

Articles of this general character, in a variety of types, have heretofore been and currently are being produced and marketed. Typical of them is an aluminum foil having a printed surface the opposite surface of which bears a material having potentially adhesive properties, said latter material being protected by an overlying backing or protective layer or laminate of paper or the like. Foil thickness is, for instance, of the order of 0.003 inch and total thickness is about 0.01 inch. In use, the paper or like backing is removed, the article is immersed in volatile organic solvent activator to develop the adhesive properties of the potentially adhesive material, and said article is then applied to the desired surface and is then squeegeed. Such articles have a number of significant disadvantages. In the first place, the manufacture is relatively costly. In the second place, their use is not conducive to rapid, economical application in that the removal of the backing paper or the like is a cumbersome and time consuming operation. Furthermore, the volatile organic solvent activators employed are characterized by pungency of odor and present severe fire hazards because of their inflammability.

Another heretofore known type of article, commonly in the form of a nameplate, comprises a thin flexible metal plate, for instance, of aluminum, one surface of which bears printed indicia, and the opposite surface of which carries a pressure sensitive adhesive protected with a cellophane or like backing. In use, article is first immersed in warm water, the water is removed with a cloth or blotter, a finger is drawn along the edge of the plate to curl back the cellophane, the latter is then peeled off, and the remaining metal plate is then pressed onto the surface to which it is to be caused to adhere. Here, again, such an article does not lend itself to rapid application in use. Moreover, the nature of the strength of the bond frequently leaves much to be desired.

Still another of this type of article comprises a relatively rigid aluminum plate, one surface of which bears printed indicia thereon. The opposite surface carries a coating of a material which, when subsequently activated with a volatile organic solvent such as trichloroethylene, tetrachlorethylene, carbon tetrachloride or toluol, is rendered tacky or adhesive and thereby said plate is caused to adhere to a suitable surface. Such articles are of limited utility and, in use, because of the nature of the organic solvent activators required to be employed, they are conducive to marked problems such as constituting fire hazards or producing adverse effects when inhaled.

Decalcomanias and other like articles have also heretofore been marketed wherein potentially adhesive backings have been activated with organic solvents to render them tacky. Such articles are made up of layers of inks and lacquers and are of a character distinctly different from the articles to which my present invention relates.

The articles of my invention comprise thin, flexible members in the form of a laminate, being particularly of the type in which one of the laminating members is a metal foil, for instance, aluminum foil, and the laminating backing material being paper or the like which is strongly adhered to the metal foil. The metal foil or the like bears printed indicia thereon, said indicia comprising, for instance, an emblem, a name, a name and address, or a design or a combination of material which may be printed on the metal foil in one color or a plurality of colors. Overlying the indicia is a lacquer-like coating of predetermined composition which serves, among other things, as a protective surface to protect the inks or the like from running or otherwise deteriorating due to the action of subsequently used organic solvents, as hereafter described.

The paper or similar backing material is also provided with a lacquer-like coating of predetermined composition but different from said first-mentioned lacquer-like coating, said two coatings being of such character that, in contact with a given selected organic solvent composition, only the lacquer-like coating on the paper or similar backing is rendered adhesive, whereby the laminate may be caused to adhere to a desired surface by pressing the same thereon, the indicia on the metal foil or the like thus being exposed to view.

In the drawing, I show, in exaggerated thickness, a section of a typical article in accordance with my invention. Numeral 10 represents the metal foil, preferably aluminum foil as indicated above, which may have a thickness of the order of a few thousandths of an inch, say 0.002 to 0.005 inch. The metal foil bears printed indicia 11 thereon, and overlying the printed indicia is the protective laquer-like coating or film 12. The metal foil is laminated to the paper or like backing 13, which is advantageously of a thickness of several thousandths of an inch to about 0.01 inch, and overlying said backing 13 is a lacquer-like coating 14. In the manufacture of the articles, the imprinting operation is advantageously first carried out on the metal foil of the laminate 10, 13 in the form of sheets or the like, the coatings 12 and 14 are then applied, for instance, by roller coating or screening procedures, and the articles are then die-cut from the large sheet.

As stated above, the lacquer-like coatings 12 and 14 are of different compositions so that the coating 14 is rendered adhesive when subjected to the action of certain organic solvent compositions, and the coating 12 is not affected by contact with said organic solvent compositions. Lacquer-like compositions of these types are, per se, well known in the art and, therefore, I make no claim to any patentable novelty in any such compositions. They should be chosen, of course, in relation to the effect thereon of any given organic solvent composition which is to be employed to render the coating 14 adhesive. I have, however, found it especially desirable to utilize butyl Cellosolve (ethylene glycol monobutyl ether) as such, and more especially, diluted with water, for instance, from ¼ volume to 1 or 2 volumes of water, as the organic solvent composition. It is particularly easy to handle and introduces no hazards of fire, is a high boiling liquid, and does not possess any objectionable odor. Where butyl Cellosolve is to be employed as the organic solvent composition to render the coating 14 adhesive but without affecting the coating 12, suitable illustrative compositions for the lacquer-like coatings 12 and 14 are as follows:

Coating 12

| | Percent |
|---|---|
| RSNC (nitrocellulose) | 7.20 |
| Alcohol | 3.05 |
| Glycol | 35.85 |
| Cobalt drier | [1] 0.50 |
| Alkyd resin | 31.40 |
| Aromatic hydrocarbon | 20.00 |
| Inert pigment | 2.00 |

[1] Of 6% product.

Coating 14

| | Percent |
|---|---|
| RSNC (nitrocellulose) | 21.00 |
| Plasticizer | 22.00 |
| Alcohol | 12.00 |
| Aromatic hydrocarbon | 6.00 |
| Glycol | 38.50 |
| Antiflooding agent | 0.50 |

These coating compositions are articles of commerce and are readily purchased on the open market as are numerous others which may be utilized in place thereof. Instead of butyl Cellosolve, other similar organic solvent materials can be employed as, for instance, methyl Cellosolve (ethylene glycol monomethyl ether), Cellosolve (ethylene glycol monoethyl ether), and the corresponding methyl, ethyl and butyl mono-ethers of diethylene glycol). In such cases, of course, as pointed out above, the lacquer-like coating compositions 12 and 14 will be so selected and correlated that only the coating 14 will be rendered adhesive when subjected to contact with the organic solvent or organic solvent composition.

In the application of the article, be it used as a nameplate, emblem or for any other purpose, it is run through a suitable applicator which applies the organic solvent composition to the paper or like backing 14 which results in softening the same and rendering it adhesive, whereupon it is applied to the desired surface with slight pressure of the fingers or otherwise. The adhesive sets relatively quickly and forms a strong, firm bond.

In the light of the foregoing, it will be seen that the articles of my invention are simple and inexpensive to produce and, in their use, the cumbersome practices of removing backings and using other techniques is avoided, which results in bringing about rapid application and consequent low cost.

What I claim as new and desire to protect by Letters Patent of the United States is:

A sign, label or the like comprising a thin flexible member in the form of metal foil having an adherent paper backing thereon, printed indicia on the surface of said metal foil comprising a composition dissolvable in an aqueous solution of butyl Cellosolve, the paper backing having on its outer surface an adhesive-forming but normally untacky lacquer-like cellulosic coating which is rendered tacky by the application of an aqueous solution of butyl Cellosolve, and said printing indicia being covered with a lacquer-like transparent synthetic resin coating which is not dissolved by said organic solvent composition, to thereby protect said printed indicia from said organic solvent.

References Cited in the file of this patent

UNITED STATES PATENTS

| 1,850,857 | Weindel | Mar. 22, 1932 |
| 1,947,549 | Fuchs | Feb. 20, 1934 |
| 2,076,387 | Stupell | Apr. 6, 1937 |